United States Patent [19]
O'Reilly

[11] Patent Number: 4,541,517
[45] Date of Patent: Sep. 17, 1985

[54] SELECTIVELY EXTENSIBLE CHUTE ASSEMBLY

[76] Inventor: Hugh T. O'Reilly, 1929 Powhatan St., Falls Church, Va. 22043

[21] Appl. No.: 472,874

[22] Filed: Mar. 8, 1983

[51] Int. Cl.⁴ .............................................. B65G 11/14
[52] U.S. Cl. ...................................... 193/4; 193/25 B; 298/7
[58] Field of Search ............... 193/4, 5, 6, 25 R, 25 C, 193/25 B; 298/7; 414/537; 160/41; 14/2, 6, 27, 69.5

[56] References Cited

U.S. PATENT DOCUMENTS

| | | | |
|---|---|---|---|
| 3,231,006 | 1/1966 | Fisher et al. | 160/41 |
| 3,511,393 | 5/1970 | Abromavage et al. | 414/537 |
| 3,999,879 | 12/1976 | Stachiw et al. | 14/27 X |

FOREIGN PATENT DOCUMENTS

| | | | |
|---|---|---|---|
| 2423865 | 12/1974 | Fed. Rep. of Germany | 14/27 |
| 2726774 | 12/1977 | Fed. Rep. of Germany | 14/27 |
| 1804219 | 3/1980 | Fed. Rep. of Germany | 193/25 B |

*Primary Examiner*—Jeffrey V. Nase
*Attorney, Agent, or Firm*—Burns, Doane, Swecker & Mathis; Burns, Doane, Swecker & Mathis

[57] ABSTRACT

A selectively extendable chute assembly includes a fabric chute covering member having a plurality of extender tubes secured thereto. A coil spring is secured inside each extender tube to continuously urge the extender tube into a retracted position. Pressurized fluid is selectively provided to the extender tubes to urge them into an extended position whereby the chute becomes usable for unloading a vehicle or another type of storage facility.

13 Claims, 5 Drawing Figures

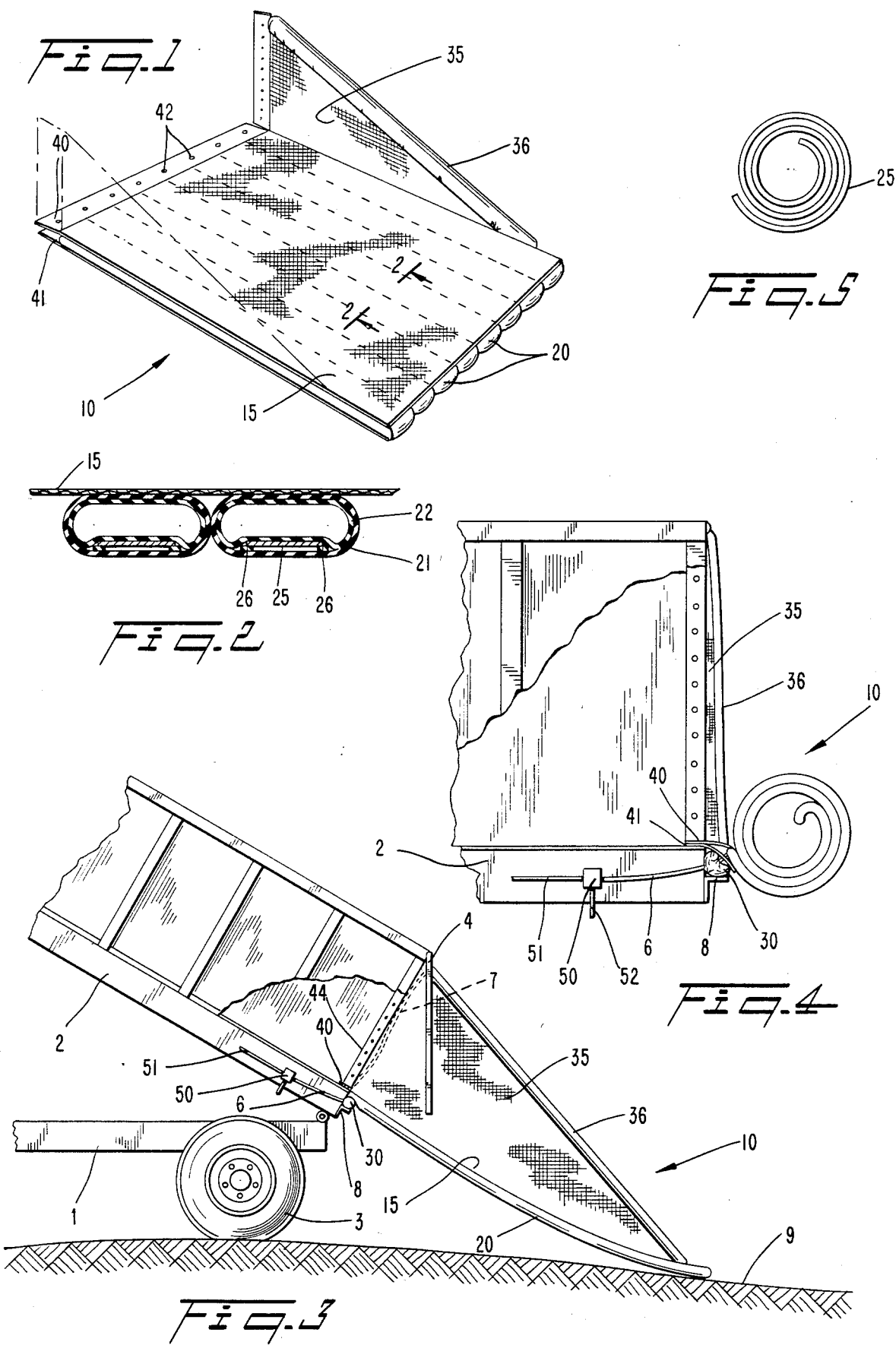

SELECTIVELY EXTENSIBLE CHUTE ASSEMBLY

BACKGROUND AND SUMMARY OF THE PRESENT INVENTION

The present invention relates generally to chutes or slides. More specifically, the present invention relates to a selectively extensible chute assembly which is deployable from a vehicle for unloading the vehicle.

Previously, the bulk unloading of some objects from vehicles has been difficult. Such objects could withstand normal piling, stacking and routine jostling during transit in a vehicle but could not withstand a straight four-foot drop from a vehicle bed to the ground during the unloadiing process. Examples of such objects include semi-finished light metal objects, aluminum piston blanks for example, some plastic items, packaged fragile goods and fruits such as melons.

Some objects were unloaded by attaching a ramp to a rear end of a vehicle such as a trailer and sliding or rolling the objects down the ramp. Fragile objects, for example melons would, however, have been often damaged while being so unloaded. Rolling a melon down a standard ramp would have damaged the melon since the ramps are hard and the melons are easily bruised. Also, it is time consuming to assemble a ramp and attach it to the back of a vehicle when unloading is desired and detach and disassemble the ramp when a further movement of the veicle is desired. It is, moreover, frequently difficult to store even a collapsed ramp so that it is readily available for further use with the vehicle.

A rigid coal chute that is permanently attached to a tiltable trailer for unloading the trailer has been previously proposed. An example of such a chute is disclosed in U.S. Pat. No. 2,439,961 issued to Bauders on Apr. 20, 1948. The chute includes a plurality of telescopic tubular sections which are arranged to permit the chute to be extended and retracted. Rotatably mounted to a rear portion of the trailer is an elbow section to which an end tubular section is secured. The other tubular sections telescope over the end tubular section when the chute is in its retracted position. A plurality of bolts is used to secure the chute sections in their extended positions.

As an example of flexible unloading devices, inflatable evacuation slides for airplanes have been used previously. One evacuation slide is mounted in a folded condition on the interior of an aircraft door. Once the door is open, an ejector bag will be inflated which in turn will inflate lateral fabrication webs restraining the bag in a generally rectangular form thereby pushing the folded slide out of a container. The evacuation slide is then inflated to extend the slide to a ground surface thereby enabling passengers to reach the ground surface on the slide. Such an evacuation slide is disclosed in U.S. Pat. No. 3,910,532 issued to Fischer on Oct. 7, 1975. Other such airplane evacuation chutes are disclosed in U.S. Pat. Nos. 2,765,131; 3,595,357 and 4,013,247.

It has also been proposed to use an inflatable chute to convey fruit from an orchard to a fruit container. Such a chute is disclosed in U.S. Pat. No. 4,256,212 issued to Markano on Mar. 17, 1981. This chute has a set of longitudinally extending bottom tubes and a pair of lateral tubular walls all of which are inflatable to form a U-shaped channel which rests on the ground. In a deflated or flat condition, the chute can be retracted into a roll by a reel.

These prior unloading devices and chutes have various disadvantages. To overcome these disadvantages, it is an object of this invention to provide an unloading device for a tilting truck body that is not only selectively extendable, but is also retractable. It is also an object of this invention to provide an unloading device that is conveniently stored on the vehicle when not in use. A further object of this invention is to provide an unloading device that may be installed on trucks or trailers without requiring extensive alterations or modifications to the truck or trailer.

Accordingly, the unloading device of this invention includes a chute which incorporates a plurality of flexible tubular members that extend upon being inflated. The chute is attached to the rear of the truck or trailer body, so that when it is inflated, the chute extends from the floor of the body to the ground. The tubular members are continuously urged toward a retracted position by coil springs that extend longitudinally of the members. Air for inflating and extending the chute is provided by the existing air brake system on the truck or trailer. The air pressure in the members is sufficient to overcome the retracting force of the coil springs, thereby keeping the chute assembly extended until the air pressure is reduced.

BRIEF DESCRIPTION OF THE DRAWINGS

A preferred embodiment of the unloading device according to the present invention is described with reference to the accompanying drawings wherein:

FIG. 1 is a perspective view partially in section of the unloading device according to the present invention;

FIG. 2 is an enlarged cross-sectional view of a portion of the chute assembly along the line 2—2 in FIG. 1;

FIG. 3 is a side elevational view partially in section of the unloading device of FIG. 1 attached to a rear portion of a vehicle;

FIG. 4 is an enlarged side elevational view of the chute assembly of FIG. 3 in its retracted position; and FIG. 5 is a side view of a coil spring of the chute assembly of FIG. 4 in its coiled position.

DETAILED DESCRIPTION OF THE PREFERRED EMBODIMENT

With reference to FIG. 1, a preferred embodiment of the chute assembly 10 according to the present invention includes a plurality of inflatable extender tubes 20 which are disposed in a side-by-side arrangement. The extender tubes 20 are connected to each other and are overlaid by a flexible covering sheet 15. The sheet 15 preferably includes a triangular panel 35 that projects outwardly from each side of the assembly of extender tubes 20. The panels 35 form a pair of side walls or bracing members for the chute assembly 10. The right side panel 35 is illustrated in full lines and the left side panel is shown in phantom lines. Alternatively, the side panels 35 may be separate members which are secured to the extender tubes 20 or the covering sheet 15. A bracing tube 36 may be provided along the upper edge of each side panel 35 to brace the side wall.

A pair of securing flaps 40, 41 are provided at the upper end of the chute 10 to secure the chute to the floor of a truck body or a dump trailer. The securing flaps 40, 41 may be connected either to the covering sheet 15 or to the extender tubes 20. Alternatively, the securing flaps 40, 41 may be integral with either the extender tubes 20 or the chute covering sheet 15. A plurality of apertures 42 are provided in the securing flaps 40, 41 to enable fasteners, such as grommets, studs, bolts or rivets (not illustrated), to secure the chute 10 to the vehicle. Of course, one securing flap may be adequate under some circumstances.

As shown in FIG. 2, each extender tube 20 has a layered construction and includes at least an inner layer 21 and an outer layer 22. The layers 21 and 22 are preferably made from a flexible rubberized fabric that is capable of retaining air under sufficient pressure to inflate the tube 20. Another suitable material would be a rubber material which is reinforced with an aramid sold by DuPont under the trademark KEVLAR. Between the inner and outer layers 21, 22, and extending along a bottom surface of each extender tube 20, is a resilient spring member 25. Preferably, the spring member 25 is a flat coil spring having rounded edges and corners, for continuously urging the tubes 20 toward a retracted position. The spring member 25 may be secured in place, for example, by adhering the inner and outer layers 21, 22 to each other at all points other than where the spring member is positioned between the layers. Of course any other conventional means of securing the spring member 25 in place could also be used. A reinforcing fabric 26 may also be secured to an inner surface of the outer layer 22 at the corner portions of the spring 25 to prevent tearing of the extender tube fabric. Of course, the extender tubes 20 may include more than two layers or plies if desired.

The several extender tubes 20 are preferably adhesively secured to each other although connecting strips of material (not illustrated) could also be used. The covering sheet 15 is preferably made of a tough flexible fabric such as canvas, although it could also be made from the same material as the extender tubes 20. The covering sheet 15 is secured over an upper surface of the outer layer 22 of each extender tube 20, preferably by an adhesive. Of course, the covering sheet 15 could also totally encase the extender tubes 20 if desired.

The springs 25 are preferably made of a resilient material such as flat spring steel which has been prestressed into a coil shape. Thus the spring 25 in its normal position is coiled up (see FIG. 5) and urges the extender tube 20 to which the spring is attached to coil up or retract. When, however, the extender tubes 20 are inflated by air or other fluid, the fluid pressure in each extender tube overcomes the coiling action of its respective coil spring 25 and straightens out that extender tube. The assembly of straightened extender tubes 20 extend in unison to deploy the chute assembly 10.

One type of vehicle to which the chute 10 may be attached is a dump trailer having a chassis 1, a trailer body 2, and a plurality of wheels 3 shown in FIGS. 3 and 4. The chute 10 is preferably attached to a rear portion of the trailer body 2 by the securing flaps 40, 41 as well as by the pair of side panels 35. Securing flaps 44 on the side panels 35 secure the panels to the trailer body's side walls 5 on either side of the tailgate 4.

A positioning tube 30, which is also inflatable, is provided along the upper end of the chute 10 to properly align the chute 10 vertically with regard to the tailgate 4 of the vehicle. The positioning tube 30 may be seated on a bracing shelf 8 of the trailer body 2 adjacent the upper end of the chute 10. If desired, the positioning tube 30 may be adhesively bonded to the extender tubes 20. An inflation hose 6 connects the various inflatable tubes to a pressurized fluid source. The inflation hose 6 communicates with the positioning tube 30 which is, in turn, connected to the extender tubes 20. Alternatively, the inflation hose 6 may be positioned along a top end of the chute 10, for example between the securing flaps 40, 41, to enable the extender tubes 20 of the chute 10 as well as the positioning tube 30 to be inflated. A pair of manifold hoses 7 (FIG. 3) supplies air from the inflation hose 6 to the bracing tubes 36.

Preferably, each extender tube 20 is approximately one foot in diameter and approximately nine feet in length when expanded. If the trailer body is eight feet wide (this being the present maximum trailer width allowed, by federal statute, on interstate highways), eight extender tubes may be provided in a side-by-side alignment to provide a chute extending across the entire width of the trailer body.

The existing air brake system of the vehicle may be used to provide the necessary source of pressurized fluid for inflating the several extender tubes 20 as well as the positioning tube 30 and the bracing tubes 36. Alternatively, if the vehicle does not have a pressurized air source (a railway car for example), a small air compressor could be used to inflate the various tubes 20, 30, 36.

As shown in FIGS. 3 and 4, an air line 51 from the vehicle air brake system supplies air under pressure to the inflation hose 6 through a switch 50. The switch 50, which is preferably controlled from the cab of the vehicle, enables automatic inflation and deflation of the extender tubes 20, the positioning tube 30 and the bracing tubes 36. A vent line 52 is provided which communicates between the control valve and the atmosphere whereby residual air may be expelled from the longitudinal tubes when the control valve is placed in a position to interrupt communication between the pressurized air source and the inflation hose and to open communication between the inflation hose and the vent line. When the chute 10 is to be deployed, the positioning tube 30 is inflated to correctly align the upper end of the chute 10 with the tailgate 4 of the trailer body 2. Simultaneously, the extender tubes 20 and the bracing tubes 36 are also inflated.

When the chute 10 is in the deployed position with the lower end resting on the ground 9, as shown in FIG. 3, various objects may be unloaded from the trailer body 2. For example, fragile objects such as fruits can be rolled or slid down the chute 10 after the trailer body 2 is raised to the position shown in FIG. 3 and the tailgate 4 is opened. The chute 10 is particularly useful for unloading fruits, such as melons, from the trailer body 2 since the melons are protected against breakage because the chute 10 is flexible. Provision of the chute on the vehicle obviates the necessity of having to unload the melons manually and thus the unloading operation can occur much more quickly. Of course, the chute 10 is also useful for unloading light metal or plastic goods or packaged fragile items from trailers.

Naturally, the trailer body does not have to be tilted in order to enable the chute 10 to be used since objects may be rolled or slid down the chute from a level trailer body as well. Also, if the trailer body is not tilted, the chute may be attached along a side of the trailer instead of at its rear. Thus, the chute 10 would also enable a standard semi-trailer to be unloaded through a side door.

When it is desired to deflate the chute 10, the switch 50 is actuated to shut off the flow of air from the air line 51 and to vent the pressurized air from the inflation tube 6. As the fluid pressure in the extender tubes 20, bracing tubes 36 and the positioning tube 30 returns to atmospheric pressure, these tubes progressively deflate. The coil springs 25 in the extender tubes are strong enough to overcome the residual air pressure in the extender tubes 20, and the tubes 20 roll up progressively from the lower end toward the upper end of the chute assembly. During this rolling up process, most of the residual air in the extender tubes 20, the positioning tube 30 and bracing tubes 36 is expelled through the inflator hose 6. As the positioning tube 30 deflats, it is compressed against the bracing shelf 8 and the rear of the trailer body 2 by the weight of the chute assembly 10. As residual air in the bracing tubes 36 and the extender tubes 20 is expelled into the atmosphere, these tubes are coiled into a compact assembly for storage. The side wall fabric 35 and the bracing tubes 36 are sufficiently flexible that they do not resist the coiling of operation of the chute assembly 10. The present invention thus provides a compact, lightweight and flexible chute assembly which can be automatically deployed and stowed.

The principles, preferred embodiments and modes of operation of the present invention have been described in the foregoing specification. The invention which is intended to be protected herein should not be construed as limited to the particular forms disclosed, however, since these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. An article unloading device comprising:
   a chute having an upper end and a lower end, said chute including a plurality of inflatable longitudinal tubes extending between said upper and lower ends, said tubes being arranged in side by side relation to form a chute surface, said chute further including means for attaching said upper end to a vehicle body whereby when said chute is deployed said lower end rests on the ground and the contents of the body may be conveniently unloaded by gravity;
   retracting means for continuously urging said tubes to retract toward one of said chute ends;
   actuator means for selectively supplying fluid from a source of fluid under pressure to inflate said tubes and thereby deploying said chute and for selectively venting said tubes so as to urge the tubes toward said one end for storage of the chute assembly; and
   an inflatable positioning tube adjacent said chute upper end, said positioning tube extending transversely of said longitudinal tubes, said positioning tube aligning the chute assembly at a proper height with respect to a vehicle body.

2. The unloading device of claim 1 wherein said retracting means includes a coil spring member in the wall of said inflatable tubes.

3. The unloading device of claim 2 wherein said coil spring extends throughout substantially the entire length of said tubes.

4. The unloading device of claim 1 further comprising:
   a pair of side wall members extending along opposite sides of said chute, said side wall members including an inflatable bracing tube.

5. The unloading device of claim 1 wherein said actuator means includes an air line for providing pressurized air from a pressurized air source;
   a control valve for regulating flow of air between said source and said chute;
   an inflation hose communicating between said longitudinal tubes and said control valve, and
   a vent line communicating between said control valve and the atmosphere whereby residual air may be expelled from said longitudinal tubes when said control valve is placed in a position to interrupt communication between said pressurized air source and said inflation hose and to open communication between said inflation hose and said vent line.

6. The chute assembly of claim 1 wherein said inflatable longitudinal tubes have a greater width than thickness, and including a covering sheet over said inflatable longitudinal tubes to provide a chute surface.

7. A selectively extendable chute assembly for unloading cargo from a vehicle, comprising:
   a plurality of elongated flexible extender tubes, said tubes being inflatable and including means joining said tubes together to form a chute surface when said tubes are inflated;
   a plurality of coil springs extending along said extender tubes, said springs continuously urging said tubes into a coiled, retracted position;
   attachment means for attaching said tubes to said vehicle at the upper end of said chute surface;
   pneumatic means for inflating the extender tubes thereby overcoming the coiling action of said springs and extending the chute surface for unloading the vehicle; and
   an inflatable positioning tube and means for mounting said positioning tube on said vehicle transversely of said extender tubes adjacent said upper end, and means for inflating said positioning tube with said extender tubes.

8. The unloading device of claim 7 wherein said coil springs are incorporated into said extender tubes.

9. The unloading device of claim 8 wherein said coil springs extend throughout substantially the entire length of said tubes.

10. The unloading device of claim 7 further comprising: a pair of side wall members extending along opposite sides of said chute, said side wall members including an inflatable bracing tube.

11. The unloading device of claim 7 wherein said pneumatic means includes an air line for providing pressurized air from a pressurized air source;
    a control valve for regulating flow of air between said source and said chute;
    an inflation hose communicating between said longitudinal tubes and said control valve; and
    a vent line communicating between said control valve and the atmosphere whereby residual air may be expelled from said longitudinal tubes when said control valve is placed in a position to interrupt communication between said pressurized air source and said inflation hose and to open communication between said inflation hose and said vent line.

12. The unloading device of claim 11 including means for mounting said pneumatic means on a vehicle body.

13. The chute assembly of claim 7 wherein said extender tubes have a greater width than thickness, and including a covering sheet over said extender tubes to provide a chute surface.